(12) United States Patent  (10) Patent No.: US 12,524,047 B2
Lo et al.  (45) Date of Patent: Jan. 13, 2026

(54) AUTOMATIC LID OPENING AND AUTOMATIC LOCKING CABINET

(71) Applicant: AETINA CORPORATION, New Taipei (TW)

(72) Inventors: Chih-Jung Lo, New Taipei (TW); Ying-Jui Hung, New Taipei (TW); Yung-Ho Lee, New Taipei (TW)

(73) Assignee: AETINA CORPORATION, New Taipei (TW)

( * ) Notice: Subject to any disclaimer, the term of this patent is extended or adjusted under 35 U.S.C. 154(b) by 99 days.

(21) Appl. No.: 18/739,340

(22) Filed: Jun. 11, 2024

(65) Prior Publication Data

US 2025/0321626 A1  Oct. 16, 2025

(30) Foreign Application Priority Data

Apr. 11, 2024 (TW) .................................. 113113594

(51) Int. Cl.
*G06F 1/18* (2006.01)
*H05K 5/03* (2006.01)

(52) U.S. Cl.
CPC ............... *G06F 1/181* (2013.01); *H05K 5/03* (2013.01)

(58) Field of Classification Search
CPC .......... G06F 1/181; G06F 1/182; G06F 1/183; H05K 5/03; H05K 5/04; H05K 5/0221; H05K 5/15; H05K 7/1405; H05K 5/023; H05K 7/1488; H05K 5/0217; G11B 33/027; E05B 65/006

See application file for complete search history.

(56) References Cited

U.S. PATENT DOCUMENTS

| 6,373,692 | B1* | 4/2002 | Cheng | G06F 1/182 |
| | | | | 292/124 |
| 6,721,183 | B1* | 4/2004 | Chen | G06F 1/181 |
| | | | | 16/404 |
| 9,696,769 | B1* | 7/2017 | Hamilton | H05K 5/03 |
| 10,798,837 | B1* | 10/2020 | Sauer | H05K 5/03 |
| 11,297,730 | B1* | 4/2022 | Tsomng | H05K 7/1402 |
| 2005/0007747 | A1* | 1/2005 | Axelrod | H05K 5/04 |
| | | | | 361/752 |
| 2010/0265643 | A1* | 10/2010 | Hood, III | G06F 1/181 |
| | | | | 384/627 |
| 2014/0001942 | A1* | 1/2014 | Mao | H05K 7/1487 |
| | | | | 312/333 |

(Continued)

*Primary Examiner* — Hiwot E Tefera

(57) ABSTRACT

An automatic lid opening and automatic locking cabinet includes a casing, a handle, and a lid. The casing has a bottom panel and multiple sidewalls. The sidewalls surround the bottom panel to form an accommodation space having an upper opening, and include first and second walls not parallel to each other. The first wall is provided with a guide rail. The handle has a grip portion disposed outside the accommodation space and an elastic piece extending toward the accommodation space. The lid has an inner protrusion and a guide slider. The inner protrusion extends toward the accommodation space, and the guide slider is configured to be slidably located in the guide rail. The lid covers the upper opening, the inner protrusion and the elastic piece interfere with each other, and the guide slider is located at a bottom of the guide rail in a direction of force of gravity.

9 Claims, 5 Drawing Sheets

(56) References Cited

U.S. PATENT DOCUMENTS

| | | | | |
|---|---|---|---|---|
| 2015/0289399 A1* | 10/2015 | Liao | ........................ | H05K 5/15 |
| | | | | 361/747 |
| 2016/0143165 A1* | 5/2016 | Wang | ................... | H05K 5/0221 |
| | | | | 361/679.58 |
| 2017/0280581 A1* | 9/2017 | Hesse | ................ | H05K 7/20172 |
| 2020/0340272 A1* | 10/2020 | Westphall | ........... | E05B 17/0025 |

* cited by examiner

AUTOMATIC LID OPENING AND AUTOMATIC LOCKING CABINET

CROSS-REFERENCE TO RELATED APPLICATION

This non-provisional application claims priority under 35 U.S.C. § 119(a) on Patent Application No(s). 113113594 filed in Taiwan, R.O.C. on Apr. 11, 2024, the entire contents of which are hereby incorporated by reference.

BACKGROUND OF THE INVENTION

1. Field of the Invention

The present disclosure relates to a cabinet, and in particular to an automatic lid opening and automatic locking cabinet.

2. Description of the Related Art

A precision electronic apparatus such as a computer host is usually stored in a cabinet for protection. To strictly protect the computer host, the cabinet needs a function of not being easily opened unexpectedly and more preferably an additional function of locking. However, such cabinet can result in difficulties in opening a lid thereof, and the complex mechanism can also cause complications in terms of operation, maintenance, repair, and costs.

BRIEF SUMMARY OF THE INVENTION

Therefore, to overcome various issues of a conventional cabinet, the present disclosure provides an automatic lid opening and automatic locking cabinet.

To achieve the above and other objects, the present disclosure provides an automatic lid opening and automatic locking cabinet, including: a casing, having a bottom panel and a plurality of sidewalls, the sidewalls surrounding the bottom panel to form an accommodation space having an upper opening, the plurality of sidewalls including a first wall and a second wall not parallel to each other, the first wall provided with a guide rail, wherein a vector of at least a section of the guide rail faces the upper opening and the second wall; a handle, disposed on the second wall, the handle having a grip portion disposed on an outside of the accommodation space and an elastic piece extending toward the accommodation space; and a lid, slidably disposed at the upper opening, the lid having an inner protrusion and a guide slider. The inner protrusion extending toward the accommodation space, and the guide slider is configured to be slidably located in the guide rail. The lid covers the upper opening, the inner protrusion, and the elastic piece interfere with each other, and the guide slider is located at a bottom of the guide rail in a direction of force of gravity.

In an embodiment of the present disclosure, the handle is configured to be movable in a direction opposite to the accommodation space, such that the elastic piece pushes the inner protrusion to drive the guide slider to ascend along the guide rail.

In an embodiment of the present disclosure, the elastic piece includes a ramp portion and a push portion. The ramp portion inclines relative to a horizontal plane, the lid covers the upper opening, the inner protrusion is located at the ramp portion, and the push portion abuts against the lid.

In an embodiment of the present disclosure, the push portion, the ramp portion, and the grip portion are sequentially connected.

In an embodiment of the present disclosure, the guide rail includes a leveled section and a lift section. A vector of the lift section faces the upper opening and the second wall, and a vector of the leveled section is horizontal and is connected to a bottom of the lift section.

In an embodiment of the present disclosure, a plurality of guide rails and guide sliders is provided.

In an embodiment of the present disclosure, two first walls are provided, the two first walls are parallel to each other, and the plurality of guide rails are respectively disposed on the two first walls.

In an embodiment of the present disclosure, the lid includes a lid portion and a side. The side is connected to the lid portion, and covers the first wall from the outside of the accommodation space, and the guide slider is inserted into the guide rail from the outside of the accommodation space.

In an embodiment of the present disclosure, the first wall is provided with a ground end.

Thus, the automatic lid opening and automatic locking cabinet of the present disclosure enables the casing and the lid to easily achieve automatic lid opening and automatic locking without the use of a key, a screw, or other complicated mechanisms. During such process, only intuitive pushing, pulling, and touching by a human hand are needed, hence being more advantageous compared with the prior art and providing an appealing appearance.

DETAILED DESCRIPTION OF THE INVENTION

To fully understand the present disclosure, the present disclosure is described in detail by way of specific embodiments with the accompanying drawings. A person skilled in the art would be able to understand the objects, features and effects of the present disclosure on the basis of the disclosure of the present application. It should be noted that, the present disclosure may be implemented or applied by other specific embodiments, and various changes and modifications may also be made on the basis of different perspectives and applications to various details in the description without departing from the spirit of the present disclosure. Technical contents associated with the present disclosure are described in detail below; however, it should be noted that the disclosure is not to be construed as limitations to the scope of claims of the present disclosure. Associated details are described below.

Figure 1:
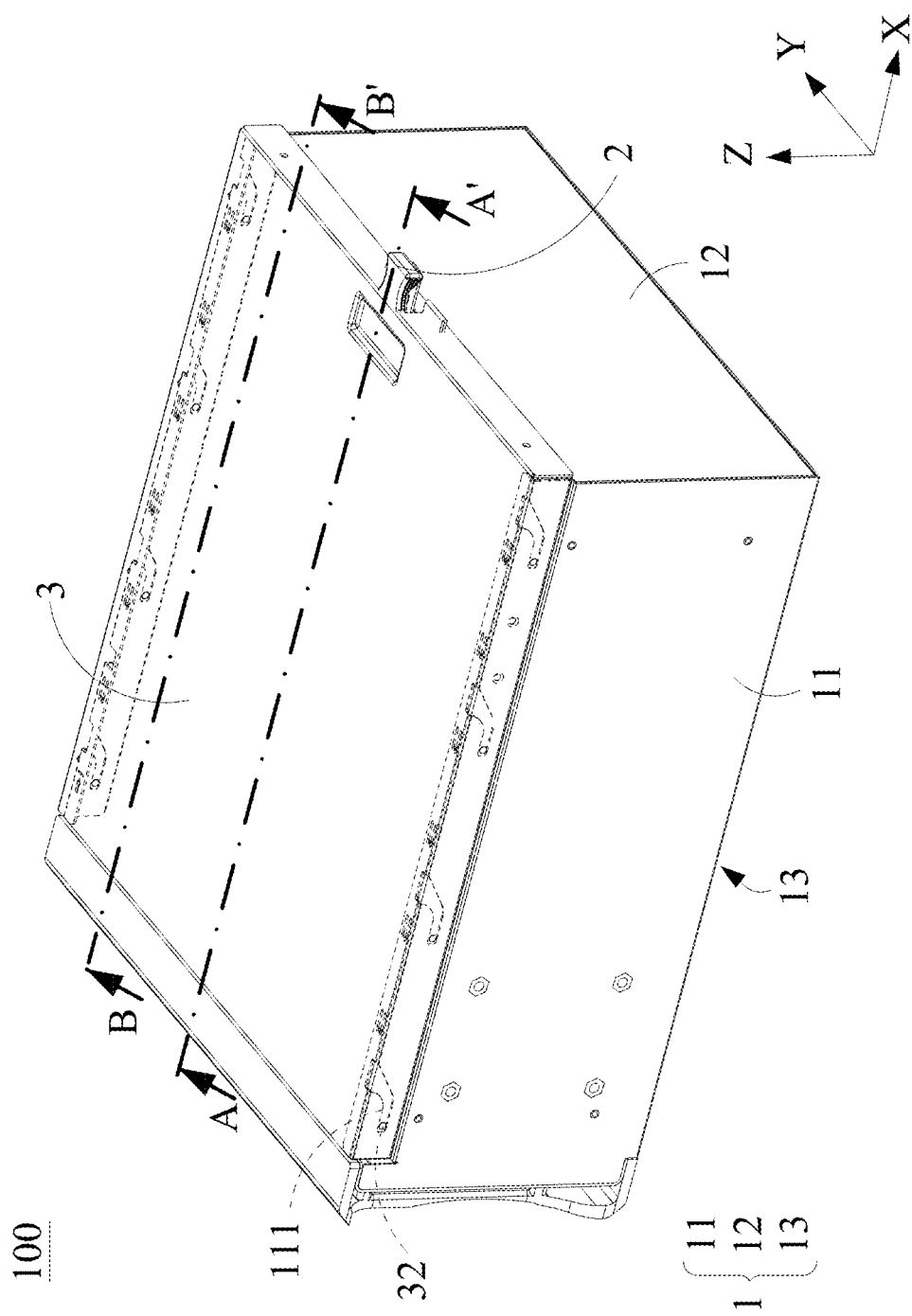
FIG. 1 is a schematic diagram of an automatic lid opening and automatic locking cabinet according to an embodiment of the present disclosure.
Figure 2:
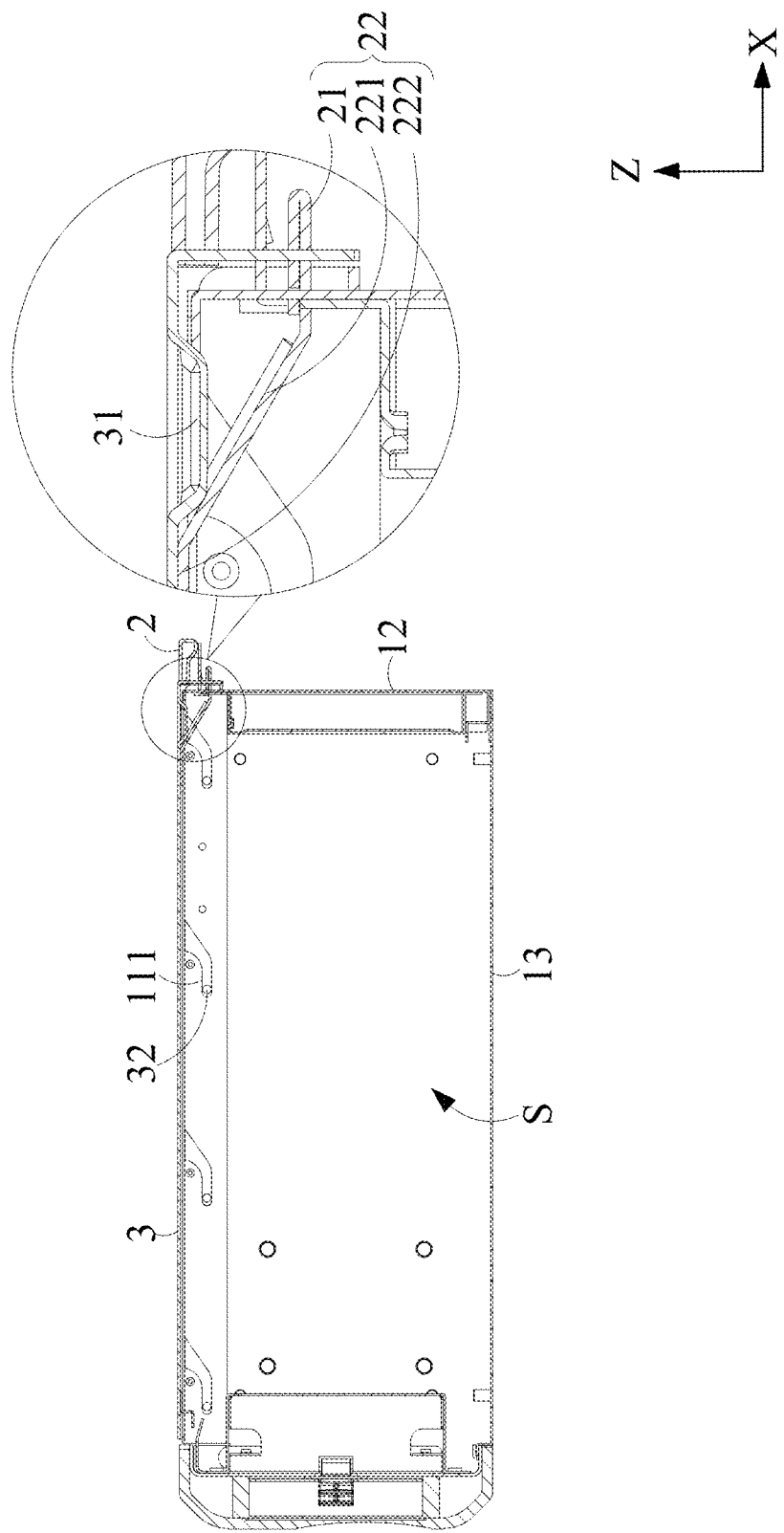
FIG. 2 is a cross-sectional diagram of an automatic lid opening and automatic locking cabinet according to an embodiment of the present disclosure.
Figure 3:
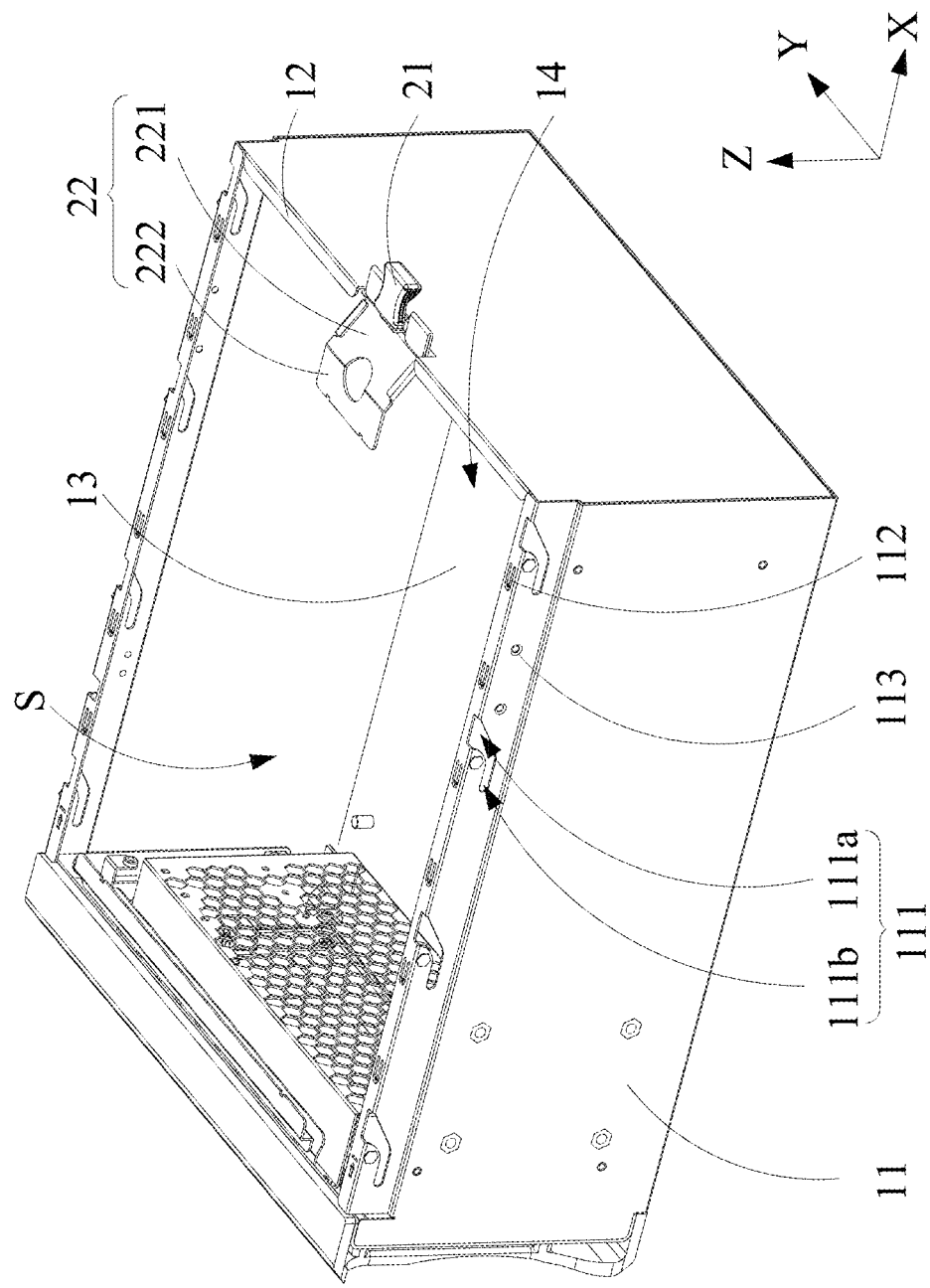
FIG. 3 is a partial enlarged schematic diagram of a casing and a handle according to an embodiment of the present disclosure.

FIG. 1 shows a schematic diagram of an automatic lid opening and automatic locking cabinet 100 according to an embodiment of the present disclosure, and is also a schematic diagram in a locked state. As shown in FIG. 1 to FIG. 3, the automatic lid opening and automatic locking cabinet 100 according to an embodiment of the present disclosure includes a casing 1, a handle 2, and a lid 3.

The casing 1 has a bottom panel 13, and a plurality of sidewalls surrounding the bottom panel 13 to form an accommodation space S having an upper opening 14. The plurality of sidewalls includes a first wall 11 and a second wall 12 not parallel to each other, and preferably, the first wall 11 and the second wall 12 are perpendicular to each other. The first wall 11 is provided with a guide rail 111. A vector of at least a section of the guide rail 111 faces the upper opening 14 and the second wall 12 (a direction facing the positive X direction and the positive Z direction in the drawings). Upper and lower directions of the upper opening 14 are determined according to a direction of the force of gravity. In an embodiment, the casing 1 is a rectangular box, however, the present disclosure is not limited to such example.

FIG. 2 shows a cross-sectional diagram along the section line A-A' in FIG. 1. As shown in FIG. 2 and FIG. 3, the handle 2 is disposed on the second wall 12, and has a grip portion 21 disposed on an outside of the accommodation space S and an elastic piece 22 extending toward the accommodation space S. The elastic piece 22 is a component subject to a force for elastic deformation and able to store elastic potential energy, for example, a metal elastic piece, however, the present disclosure is not limited to such example. The grip portion 21 is not defined to have a specific shape, and is preferably shaped to be readily held by a human hand.

Figure 4:
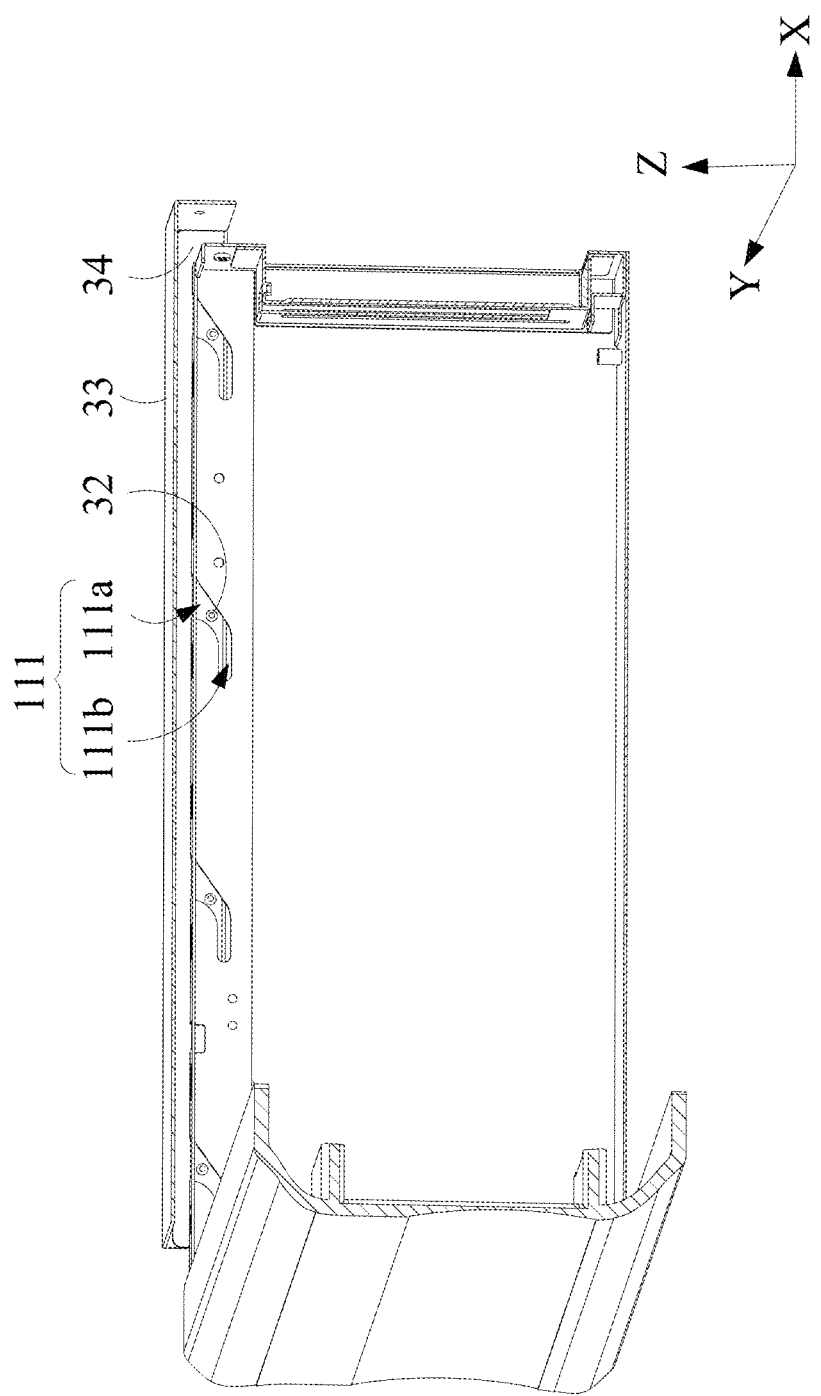
FIG. 4 is a cross-sectional diagram of a lid according to an embodiment of the present disclosure.

FIG. 4 shows a cross-sectional diagram along the section line B-B' in FIG. 1. As shown in FIG. 1, FIG. 2, and FIG. 4, the lid 3 is slidably disposed at the upper opening 14 and covers the accommodation space S. The lid 3 has an inner protrusion 31 and a guide slider 32. The inner protrusion 31 protrudes toward the accommodation space S, and the guide slider 32 is configured to be slidably located in the guide rail 111. In an embodiment, the inner protrusion 31 is formed by means of stamping the lid 3, however, the present disclosure is not limited to such example. The inner protrusion 31 protruding from an inner surface of the lid 3 can also be formed by means of welding or adhesion. In an embodiment, the guide slider 32 is configured to be shaped as a protruding post, however, the present disclosure is not limited to such example. Any shape or feature matching the guide rail 111 can serve as the guide slider 32 of the present disclosure.

As shown in FIG. 1, the lid 3 covers the upper opening 14. Due to influences of the force of gravity, the lid 3 presses downward, such that the guide slider 32 is located at a bottom of the guide rail 111 in the direction of the force of gravity. The force of gravity forces the inner protrusion 31 to press against the elastic piece 22, rendering the inner protrusion 31 and the elastic piece 22 to interfere with each other, and the elastic piece 22 to store elastic potential energy. This is a locked state.

Figure 5:
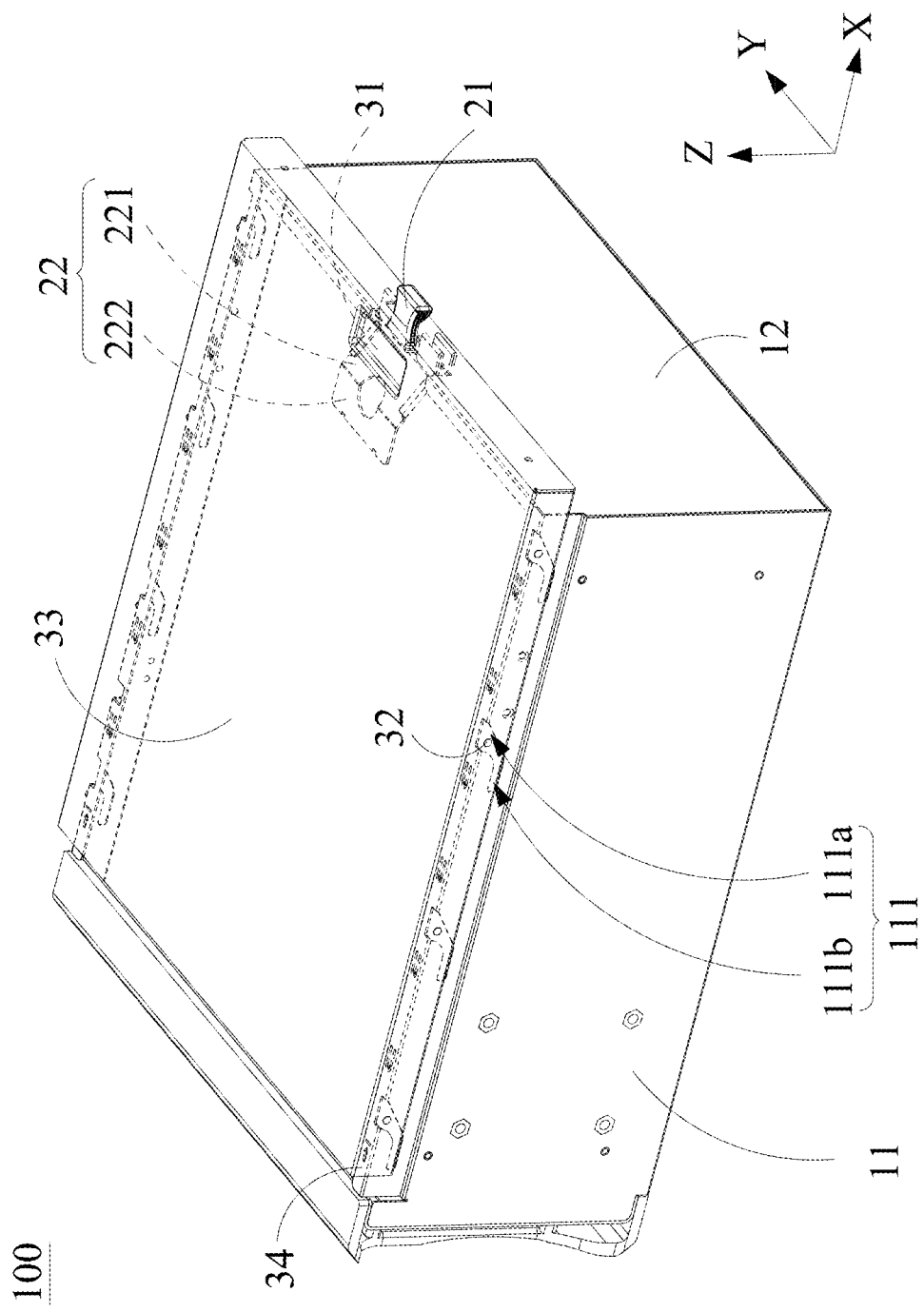
FIG. 5 is a diagram of unlocking of an automatic lid opening and automatic locking cabinet according to an embodiment of the present disclosure.

To release the locked state, a user can hold the grip portion 21 of the handle 2 to move in a direction opposite to the accommodation space S (that is, pulling along the X direction in the drawing), rendering the elastic piece 22 to push the inner protrusion 31 to similarly move along the X direction in the drawing and the elastic piece 22 to release the elastic potential energy, hence driving the guide slider 32 to ascend along the guide rail 111 to complete the automatic lid opening as shown in FIG. 5.

On the other hand, for re-locking, the lid 3 is lightly pushed to apply a force opposite to the X-axis direction, the guide slider 32 can then move downward along the guide rail 111, and the force of gravity acting downward forces the inner protrusion 31 to again press against the elastic piece 22 for mutual interference, hence restoring to the locked state.

In conclusion, using the mutual interference between the inner protrusion 31 and the elastic piece 22 as well as the design of the guide rail 111, the automatic lid opening and automatic locking cabinet 100 of the present disclosure enables the casing 1 and the lid 3 to easily achieve automatic lid opening and automatic locking without the use of a key, a screw, or other complicated mechanisms. During such process, only intuitive pushing, pulling, and touching by a human hand are needed, hence being more advantageous compared with the prior art and providing an appealing appearance.

Further, as shown in FIG. 2 and FIG. 3, in an embodiment, the elastic piece 22 includes a ramp portion 221 and a push portion 222. The ramp portion 221 with respect to a horizontal plane in the sense of the direction of the force of gravity is inclined. When the lid 3 covers the upper opening 14 (the states in FIG. 1 and FIG. 2), the inner protrusion 31 is located at the ramp portion 221, and the push portion 222 abuts against the lid 3. At this point in time, both of the ramp portion 221 and the push portion 222 preferably are pressed by the force of gravity from the lid 3. When the grip portion 21 moves in a direction opposite to the accommodation space S, the ramp portion 221 moves in the X direction relative to the inner protrusion 31, the push portion 222 eventually comes into contact with the inner protrusion 31, and the released elastic potential energy acts on the inner protrusion 31 and pushes the lid 3. In an embodiment, the push portion 222, the ramp portion 221, and the grip portion 21 are sequentially connected in a direction away from the accommodation space S, that is, a direction along which the lid 3 is drawn outward. However, the present disclosure is not limited to the examples above. In other embodiments, the specific structure of the elastic piece 22 can be modified and adjusted.

Further, as shown in FIG. 3 and FIG. 4, in an embodiment, the guide rail 111 includes a leveled section 111b and a lift section 111a. A vector of the lift section 111a faces the upper opening 14 and the second wall 12 (the positive X direction), and a vector of the leveled section 111b is horizontal and is connected to a bottom of the lift section 111a. As such, when the lid 3 is lifted by an elastic force from the elastic piece 22, the guide slider 32 moves upward along the lift section 111a. When the lid 3 presses downward due to the force of gravity, the guide slider 32 slides downward from the lift section 111a and thus moves to the leveled section 111b, and the lid 3 exactly completely covers the upper opening 14 when the guide slider 32 slides to an end of the leveled section 111b.

Further, in an embodiment, a plurality of guide rails 111 and guide sliders 32 are provided. The plurality of guide rails 111 and guide sliders 32 can help the lid 3 to distribute pressure and promote smoother movement.

Further, in an embodiment, two first walls are provided 11 and the two first walls 11 are parallel to each other, and the plurality of guide rails 111 are respectively disposed on the two first walls 11. Each first wall 11 can have only one guide rail 111, or each first wall 11 can have multiple guide rails 111.

Further, as shown in FIG. 4, in an embodiment, the lid 3 includes a lid portion 33 and a side 34, wherein the lid portion 33 is a main part covering the upper opening 14. The side 34 is connected to the lid portion 33, and covers the first wall 11 from the outside of the accommodation space S, such that the guide slider 32 (disposed on an inward facing surface of the side 34) is inserted into the guide rail 111 from the outside of the accommodation space S. Thus, the lid 3 is provided with better coverage. However, the present disclosure is not limited to the examples above. In other embodiments, the guide slider 32 of the lid 3 can also be inserted into the guide rail 111 from the inside of the accommodation space S.

Further, as shown in FIG. 3, in an embodiment, the first wall 11 is provided with a ground end 112 and a mounting hole 113. The ground end 112 is a contact terminal divided from the first wall 11, and can be used to contact an electronic device in the accommodation space S to conduct electric charges from the inside of the accommodation space S to the ground via the first wall 11. The mounting hole 113 is a through hole of the first wall 11, and can be used to mount other electronic parts, for example, a sensor for detecting lid opening or an electrostatic sensor.

While the present disclosure has been described by means of specific embodiments, numerous modifications and variations could be made thereto by those skilled in the art without departing from the scope and spirit of the present disclosure set forth in the claims.

What is claimed is:

1. An automatic lid opening and automatic locking cabinet, comprising:
    a casing, having a bottom panel and a plurality of sidewalls, the plurality of sidewalls surrounding the bottom panel to form an accommodation space having an upper opening, the plurality of sidewalls comprising a first wall and a second wall not parallel to each other, the first wall provided with a guide rail, wherein a vector of at least a section of the guide rail faces the upper opening and the second wall;
    a handle, disposed on the second wall, the handle having a grip portion disposed on an outside of the accommodation space and an elastic piece extending toward the accommodation space; and
    a lid, slidably disposed at the upper opening, the lid having an inner protrusion and a guide slider, the inner protrusion extending toward the accommodation space, the guide slider configured to be slidably located in the guide rail;
    wherein, the lid covers the upper opening, the inner protrusion and the elastic piece interference with each other, and the guide slider is located at a bottom of the guide rail in a direction of the force of gravity.

2. The automatic lid opening and automatic locking cabinet according to claim 1, wherein the handle is configured to be movable in a direction opposite to the accommodation space, such that the elastic piece pushes the inner protrusion to drive the guide slider to ascend along the guide rail.

3. The automatic lid opening and automatic locking cabinet according to claim 1, wherein the elastic piece comprises a ramp portion and a push portion, the ramp portion inclines relative to a horizontal plane, the lid covers the upper opening, the inner protrusion is located on the ramp portion, and the push portion abuts against the lid.

4. The automatic lid opening and automatic locking cabinet according to claim 3, wherein the push portion, the ramp portion, and the grip portion are sequentially connected.

5. The automatic lid opening and automatic locking cabinet according to claim 1, wherein the guide rail comprises a leveled section and a lift section, a vector of the lift section faces the upper opening and the second wall, and a vector of the leveled section is horizontal and is connected to a bottom of the lift section.

6. The automatic lid opening and automatic locking cabinet according to claim 1, wherein a plurality of guide rails and guide sliders are provided.

7. The automatic lid opening and automatic locking cabinet according to claim 1, wherein two first walls are provided, the two first walls are parallel to each other, and the plurality of guide rails are respectively disposed on the two first walls.

8. The automatic lid opening and automatic locking cabinet according to claim 1, wherein the lid comprises a lid portion and a side, the side is connected to the lid portion and covers the first wall from the outside of the accommodation space, and the guide slider is inserted into the guide rail from the outside of the accommodation space.

9. The automatic lid opening and automatic locking cabinet according to claim 1, wherein the first wall is provided with a ground end.

* * * * *